Dec. 14, 1937.   J. J. CONNELL   2,102,494
LOCK WASHER
Filed Nov. 2, 1932
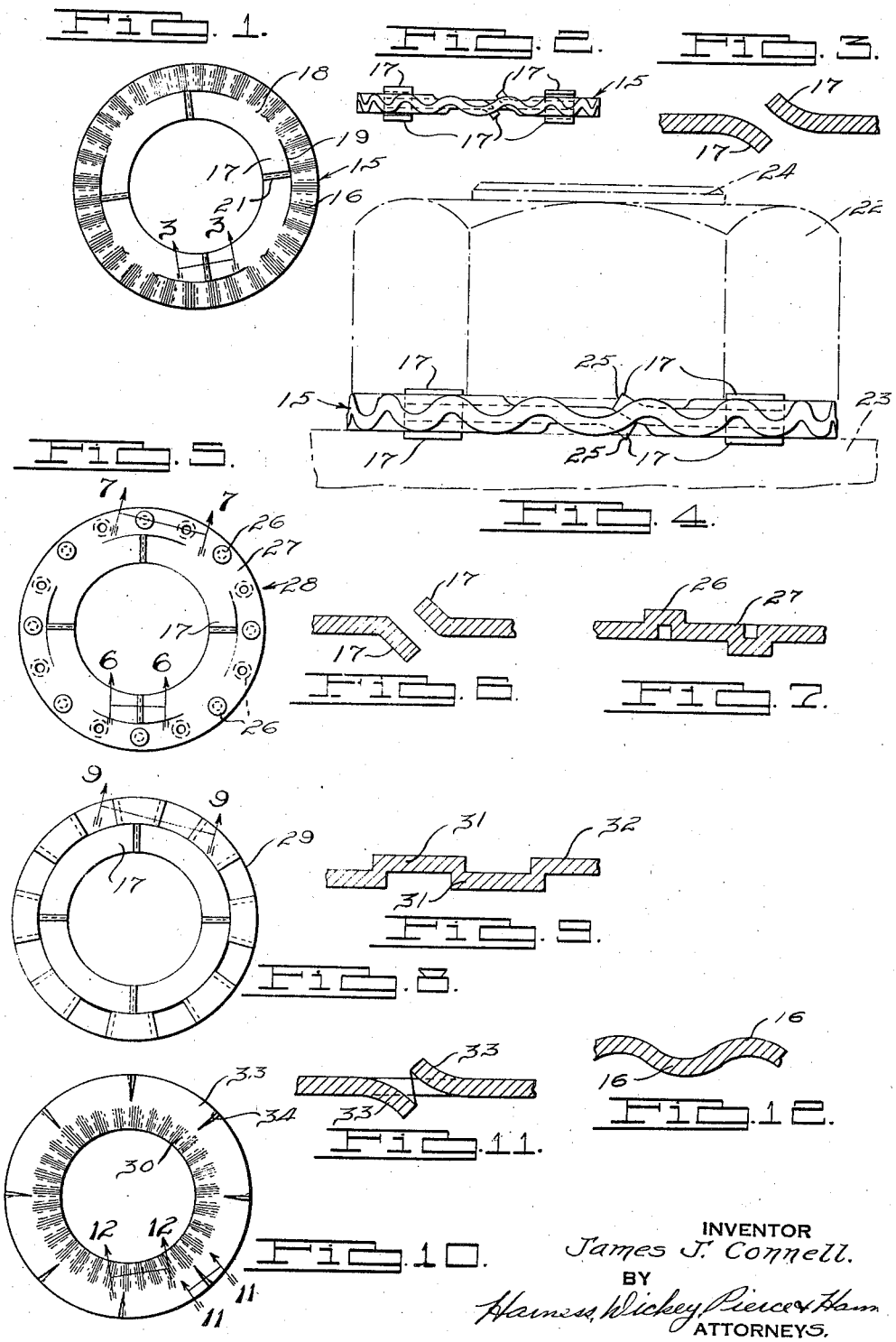

Patented Dec. 14, 1937

2,102,494

UNITED STATES PATENT OFFICE 2,102,494

LOCK WASHER

James J. Connell, Detroit, Mich., assignor, by mesne assignments, to Illinois Tool Works, Chicago, Ill., a corporation of Illinois Application November 2, 1932, Serial No. 640,853

11 Claims. (Cl. 10—73)

My invention relates to lock washers and particularly to a lock washer of the prong type constructed in such manner as to have the prongs overlapping to effect a positive lock between an element and a nut, a washer, a bearing race or like element.

In my Patent No. 1,878,827 issued September 20, 1932, and assigned to the assignee of the present invention, I illustrated, described and claimed a lock washer of novel construction wherein the outer body portion was provided with alternate projections effected by sinuous surfaces in the nature of corrugations which receive the load of the tightened nut. The inner body portion of the washer was constructed to form resilient prongs which were alternately extended so as to project above the corrugations to engage the nut and the element against which the nut was tightened. While the lock washer of this construction was new and novel and an advancement in the art, the present invention is drawn to an improvement of the lock washer, effected by the over-lapping of the resilient prongs which, when moved into engagement with each other, form a positive locking engagement with the nut and the element toward which the nut is advanced. As a result, a positive locking of the nut is effected where heretofore the resiliency of the prongs was depended upon for producing the embedding of the prongs in the metal of the surfaces.

Accordingly, the main objects of my invention, are to provide a lock washer having prongs which positively engage the metal of elements between which the washer is disposed; to provide a lock washer having prongs which are resilient and which overlap each other to provide locking portions which project above the body of the washer in engagement with the metal of elements between which the washer is disposed; to provide a lock washer with raised portions on the outer or inner body portion and with prongs on the other portion which overlap and which, when in engagement with each other, project above said raised portion; to provide a lock washer in which the raised portions may be on the inner or outer body portion of the washer, the opposite body portion being provided with prongs which overlap each other to form engaging ends which project above the raised portion to engage the metal between which the washer is disposed; and in general to provide a lock washer which is simple in construction; economical of manufacture and positive in operation.

Other objects and features of novelty of my invention will be either specifically pointed out or will become apparent, when referring, for a better understanding of my invention, to the following description in conjunction with the accompanying drawing, wherein:

Figure 1 is a plan view of a lock washer embodying features of my invention,

Fig. 2 is an elevational view of the lock washer illustrated in Fig. 1,

Fig. 3 is an enlarged sectional view of a portion of the lock washer illustrated in Fig. 1, taken on the line 3—3 thereof, Fig. 4 is an enlarged view of a lock washer, similar to that illustrated in Fig. 1, showing its mode of operation, Fig. 5 is a plan view of a lock washer similar to that illustrated in Fig. 1, showing a modified form thereof, Fig. 6 is an enlarged sectional view of the structure illustrated in Fig. 5, taken on the line 6—6 thereof, Fig. 7 is an enlarged sectional view of the structure illustrated in Fig. 5, taken on the line 7—7 thereof, Fig. 8 is a plan view of a washer similar to that illustrated in Figs. 1 and 5, showing a modified form thereof, Fig. 9 is an enlarged sectional view of the structure illustrated in Fig. 8, taken on the line 9—9 thereof, Fig. 10 is a plan view of a lock washer similar to that illustrated in Figs. 1, 5 and 8, showing a still further modified form thereof, Fig. 11 is an enlarged sectional view of the structure illustrated in Fig. 10, taken on the line 11—11 thereof, and Fig. 12 is an enlarged sectional view of the structure illustrated in Fig. 10, taken on the line 12—12 thereof.

Referring to Figs. 1 to 4 inclusive, I have illustrated a lock washer 15, which is similar to the lock washer illustrated in my above mentioned patent, except for the overlapping prongs. The washer is provided with an outer sinuous portion 16 to which inner prongs 17 are supported at the point 18. The prongs are formed by the separation of the material thereof from the portion 16 along the lines 19 and from each other along the line 21. During the forming operation the prongs are caused to move relative to each other into a position of overlap, as illustrated more particularly in Figs. 3 and 4 and which will now be described.

In constructing the washer I first stamp out the blank from a sheet of hardenable material and thereafter form the cuts 19 and 21, which operation causes the fingers 17 to move in opposite directions to each other and to the plane of the washer. Thereafter the washer is formed into a desired shape, being placed in a die which preforms the fingers 17 into an arcuate or angular shape relative to the supporting portion 18 at the same time the sinuous portions 16, in the nature of corrugations or the like, are formed in the outer portion of the washer by a drawing operation. The effect of forming the metal at the time the prongs 17 are being formed within the die, causes the prongs to move angularly into an overlapping position, as illustrated in Figs. 2, 3 and 4. The ends of each pair of prongs 17 extend beyond the sinuous portions 16 for engagement with the metal of the nut and that of the element toward which the nut is advanced.

The positive locking effected by the overlap portions of the prongs 17 is illustrated clearly in Fig. 4 wherein the nut 22 is drawn against an element 23 carrying the stud 24. The washer 15 has the tips 25 of the engaged prongs 17 projecting into the metal of the nut 22 and the element 23 when the nut tightly engages the sinuous portion 16 of the washer.

It will be noted that the angle formed by the tip 25 of the prong is obtuse relative to the engaged surface of the nut 22, in the direction in which the nut is tightened on the washer permitting the metal to slide more or less readily over the prongs during the tightening movement. The front face of the prong is disposed at substantially a right angle to the surface of the nut so as to directly oppose its movement in an opposite direction. This relation is true of the other of each pair of prongs relative to the element 23 and in this manner a positive locking is assured which prevents the loosening of the nut during the vibration of the element 23.

While I have illustrated but four sets of prongs on the washers illustrated in Figs. 1, 5 and 8, it will be understood that a greater or less number of prongs may be provided depending upon the size of the washer and the metal with which it is to be employed.

Referring to Figs. 5, 6 and 7 I have shown a slightly modified form of construction from that illustrated in Fig. 4, wherein in place of the sinuous projections 16 in the nature of the corrugation, I have substituted raised portions or bosses 26 struck from the outer body portion 27 of the washer 28 on opposite sides of the washer to provide projections for engagement with the surface of the nut 22 and the element 23. The bosses 26 take the load of the nut and are formed by punches in the die during the forming operation of the prongs 17. This forming and punching operation is done in the same dies and at the same time and sufficiently works the metal of the washer to cause the prongs to overlap.

Referring to Figs. 8 and 9, I have shown a further modified form of washer 29 which combines the features of the washer 15 and 28 above described. The washer 29 while being provided with the overlapping fingers 17 has the outer body portion thereof provided with bosses 31 which are formed by offsetting the metal at right angles to each other in opposite directions to produce flat surfaces 32 with which the surfaces of the nut 22 and the element 23 contact. This drawing operation is effected at the time the fingers 17 are formed, to thereby cause the angular movement of the prongs to effect their overlapping relation.

While I have illustrated in Figs. 1, 5 and 8, lock washers with the prongs disposed on the inner body portion thereof and the projecting bosses on the outer body portion, it is to be understood that the prongs and projections may be interchanged and formed in the outer and inner body portions, respectively.

Referring to Figs. 10, 11 and 12, I show a still further modified form of lock washer wherein the reversal of construction is utilized, that is to say the sinuous projections 16 or the bosses 26 and 31, as the case may be, are disposed on the inner portion of the lock washer and prongs 33 are provided on the outer portion thereof. While the prongs may be formed as above described, I have illustrated a modified form of construction which will now be described.

The washer is constructed in a similar manner to the ones above described, being cut from a blank sheet of material during which cutting or directly thereafter the material is cut along the lines 34. After the cutting operation, the prongs which project in opposite directions, are formed into predetermined shape, as illustrated in Fig. 11, during the time the corrugations 16 or bosses 26 or 31, as the case may be, are formed in the inner body portion of the washer. The forming of the inner portion at the time the prongs are formed, causes the prongs to move into overlapping relation and thereby provide the positive locking effected by my washer. This type of construction is particularly useful when more of the prongs 33 are desirable, owing to the greater peripheral length at the outer portion of the washer.

Referring to Figs. 3 and 6, it will be noted that I have illustrated two types of prongs 17, the ones in Fig. 3 being arcuate in shape, struck on a suitable radius, while those of Fig. 6 are angularly related to the supporting portion. Either type of prong may be employed with the various modified forms of washers described, depending upon the particular purpose for which the washer is to be employed.

It will thus be seen that I have provided a lock washer having projecting portions with which the nut and supporting element engage and provided with a plurality of resilient prongs which project above the surfaces when in engagement with each other to thereby positively engage the metal on the nut or element. The prongs slope in a direction in which the nut is moved toward the washer so as to directly oppose the movement of the nut in the opposite direction. The lock washer is new and novel and is a material advancement in the art of locking nuts or other movable elements relative to another element in a positive manner.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A lock washer provided with a flat body portion and a plurality of circumferentially disposed overlapping fingers having work engaging edges positioned out of the plane of said body portion, said fingers having their original length and thickness, and the body portion being corrugated to cause the fingers to move in overlapping relation.

2. A lock washer having circumferentially disposed work engaging fingers, said fingers having their original length and thickness, and a body portion carrying said fingers and having corrugations formed therein which cause portions of adjacent fingers to overlap, the corrugations being of such depth that the work engaging sections of the overlapping portions of the fingers extend beyond the bounding planes of the corrugations.

3. The method of forming a lock washer which includes, stamping circumferential fingers in a sheet of metal, and of corrugating the body portion of the metal to cause the fingers to advance and be in overlapping relation.

4. The method of forming a lock washer which includes, stamping circumferentially disposed work engaging fingers out of a sheet of metal, and of corrugating the body portion of the metal to cause the ends of the fingers to move into overlapping relation, the corrugations being of such depth relative to the thickness of the material as to have the work engaging sections of the fingers project beyond the bounding planes of the corrugations.

5. The method of making lock washers which includes the steps of providing a section of stock having a plurality of separate adjacent marginal prongs and a continuous body portion to which said prongs are joined; and working the material of said continuous portion in a direction transverse to the plane of the washer body to effect an overlapping of adjacent prongs.

6. The method of making lock washers which includes the steps of providing an annular section of stock having a plurality of adjacent outer marginal prongs, and working the material of the inner margin of said section in a direction transverse to the plane thereof to effect an overlapping of adjacent prongs.

7. The method of making lock washers which includes the steps of providing a section of stock having an aperture therein and having a plurality of separate adjacent marginal prongs adjacent said aperture and a continuous body portion to which said prongs are joined; and working the material of said portion in a direction transverse to the plane of said body to effect an overlapping of said adjacent prongs.

8. The method of making lock washers of the type for application between parallel work surfaces which includes forming a plurality of radial slits along one margin of an annular washer blank whereby to provide a blank having a plurality of adjacent marginal prongs and a continuous circular portion to which said prongs are attached, warping said prongs so as to provide work engaging teeth thereon on opposite sides of the blank, and transversely working the metal of said continuous portion to effect an overlapping of adjacent prongs, radially contiguous parts of said continuous portion being maintained in parallel planes during the working operation.

9. The method of making lock washers which comprises forming a plurality of radial slits along the inner margin of an annular washer blank whereby to provide a blank having a plurality of adjacent marginal prongs along its inner margin and a continuous circular portion along its outer margin to which said prongs are attached, warping said prongs so as to provide work engaging teeth thereon on opposite sides of the blank, and transversely working the metal of said continuous portion to effect an overlapping of adjacent prongs.

10. The method of making lock washers of the type for application between parallel work surfaces which includes marginally severing a flat type annular washer blank along one margin thereof to provide a blank having a plurality of adjacent marginal prongs and a continuous circular portion to which said prongs are attached, warping said prongs so as to provide work engaging teeth thereon on opposite sides of the blank, and transversely working the metal of said continuous portion to effect a circumferential shifting of adjacent prong margins whereby to bring adjacent prongs into overlapping relation while maintaining the blank body in a general flat state.

11. A lock washer of the type for application between parallel work surfaces comprising an annular corrugated washer body, said body having its radially contiguous parts in parallel planes, radially extending prongs provided in adjacent relation along one marginal edge of said body, said prongs being warped to provide work engaging teeth extending on opposite sides of the body, and adjacent prongs being in overlapping relation and being of undiminished thickness with respect to the washer body.

JAMES J. CONNELL.